Jan. 24, 1950　　　　G. C. FRANCIS　　　　2,495,449
LATCHING MEANS FOR TRAILERS
Filed July 14, 1948　　　　　　　　　　　　3 Sheets-Sheet 1
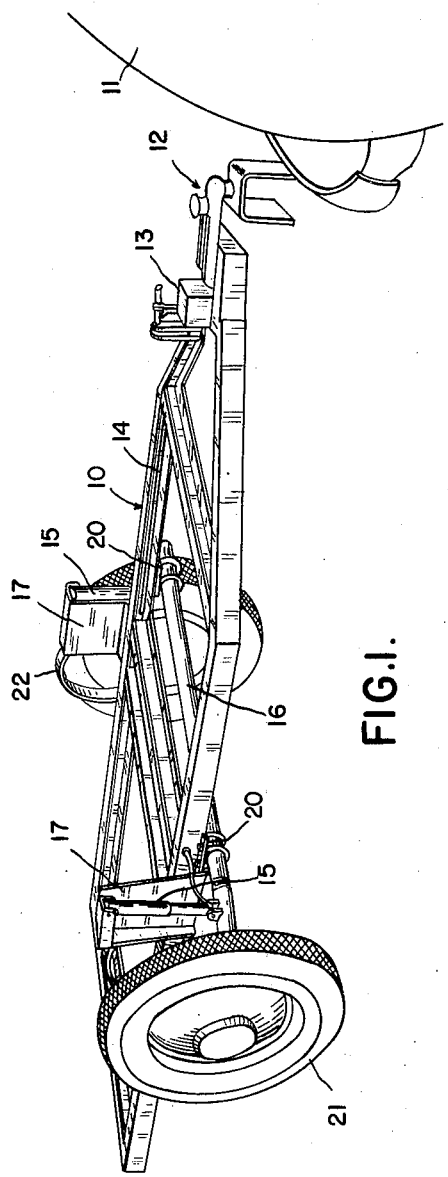
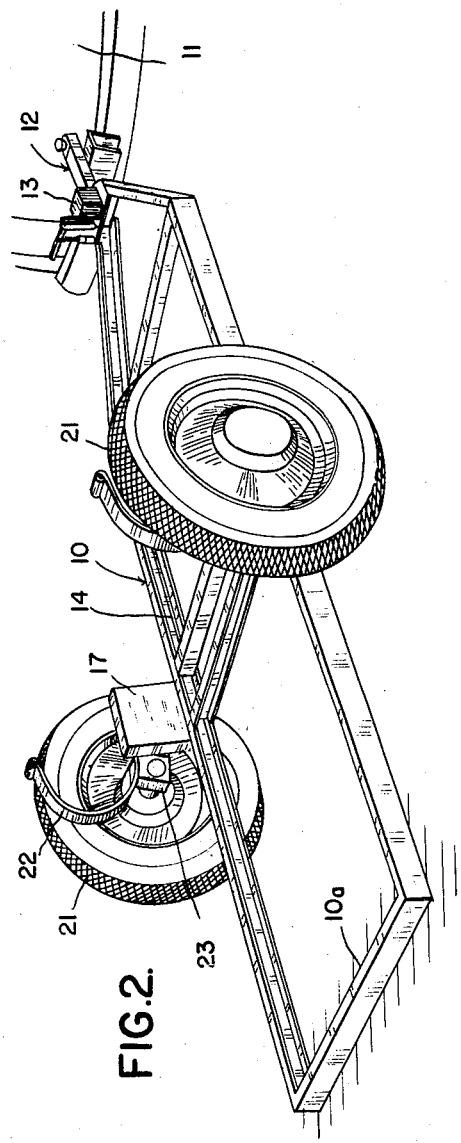
*INVENTOR.*
GERALD C. FRANCIS
BY *Hauke & Hardesty*
ATTORNEYS Jan. 24, 1950 G. C. FRANCIS 2,495,449
LATCHING MEANS FOR TRAILERS
Filed July 14, 1948 3 Sheets-Sheet 2
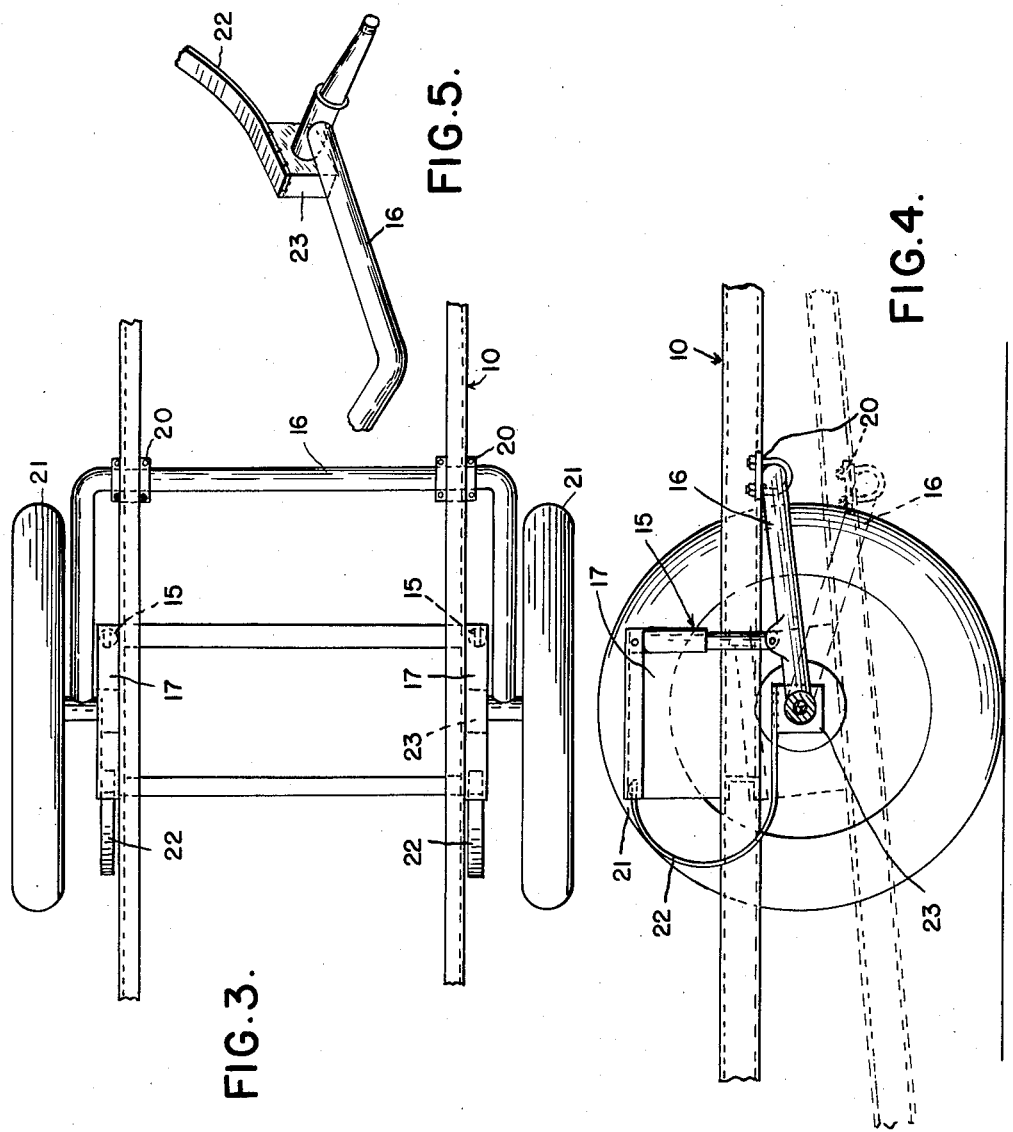
INVENTOR.
GERALD C. FRANCIS
BY
ATTORNEYS Jan. 24, 1950  G. C. FRANCIS  2,495,449
LATCHING MEANS FOR TRAILERS
Filed July 14, 1948  3 Sheets-Sheet 3

INVENTOR.
GERALD C. FRANCIS
BY Hauke & Hardesty
ATTORNEYS

Patented Jan. 24, 1950

2,495,449

UNITED STATES PATENT OFFICE 2,495,449

LATCHING MEANS FOR TRAILERS

Gerald C. Francis, Lansing, Mich.

Application July 14, 1948, Serial No. 38,693

6 Claims. (Cl. 280—44)

1

My invention relates to trailers, and more particularly to an improved latching means applicable to a trailer of the type described in which the trailer chassis is hinged to the trailer axis so that same can be lowered or elevated as desired and detachably connected or engaged with a spring member yieldingly supporting the chassis in such elevated position.

Such trailers are supposedly constructed for "one-man" loading and hauling, and it is difficult to properly align the spring member with respect to the keeper or socket provided on the chassis so as to properly secure the spring members in the socket when the loaded trailer chassis is lowered on its spring support.

It is an object of my present invention to overcome the present difficulties in the use of this trailer by providing a novel and improved latching means, which locks the spring member and which temporarily locks or secures the spring member in alignment with the socket, so that same can at all times be positively secured in operable relation, whereby to facilitate the usefulness of this special type of trailer.

For a more detailed understanding of my invention reference may be had to the accompanying drawings illustrating a preferred embodiment thereof, in which like characters refer to like parts throughout the several views, and in which Fig. 1 is a perspective view of a low-boy hydraulic lift trailer in operable position for hauling.

Fig. 2 is a similar perspective view showing the trailer in loading position.

Fig. 3 is a fragmentary plan view of the trailer.

Fig. 4 is a fragmentary side elevation view of the trailer.

Fig. 5 is a fragmentary perspective view of a portion of the axle and the spring mount.

Figure 8:
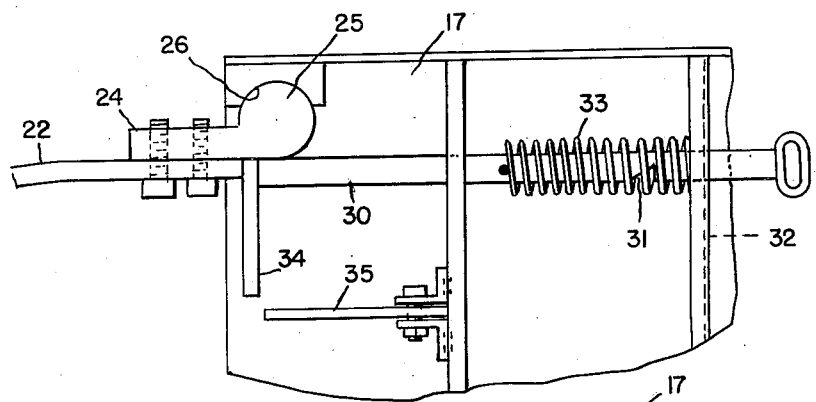
Fig. 8 is a similar detail view showing the spring member fully engaged and locked in said socket.

The present invention is particularly applicable to a conventional hydraulic lift trailer of the

2 type comprising a chassis 10 adapted to be attached to an automotive vehicle 11 by any suitable coupling device 12. The trailer chassis carries a conventional fluid pressure pump 13, usually of the manually operated type, and fluid lines 14 connected with the pump lead to a pair of hydraulic lift jacks 15, these jacks being preferably carried by the trailer axle 16 and connected with brackets 17 mounted on the chassis.

The chassis is hinged to the axle by means of suitable brackets 20, said axis having conventional traction wheels 21 mounted thereon. The spring member for supporting said chassis comprises a leaf spring 22 secured at one end to a block 23 secured to the axle 16 and at the other end to the bracket 17, as will be hereafter described. The total load of the trailer is carried through these spring members.

Figure 6:
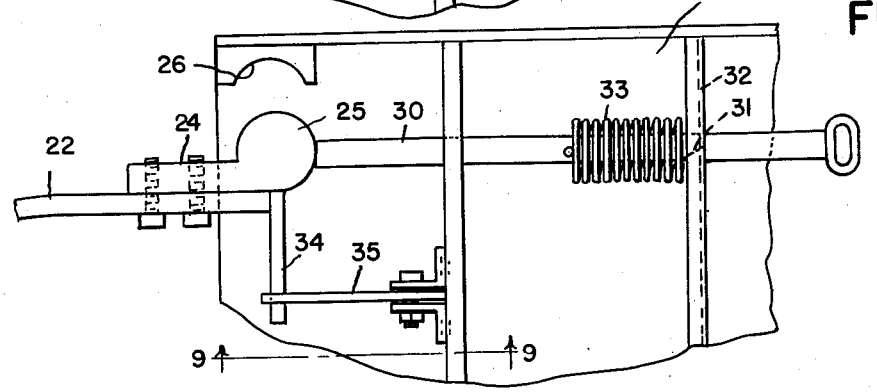
Fig. 6 is a detail elevational view of the latching means, when the spring member is initially moved into alignment with the socket.
Figure 9:
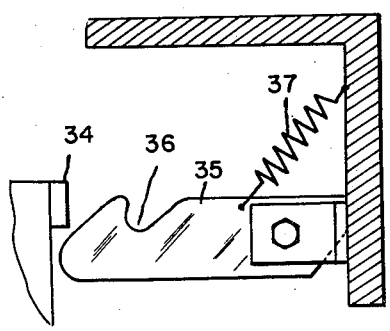
Fig. 9 is a detail view taken on the line 9—9 of Fig. 6, showing the latch for locating the spring member.

In order to conveniently load the trailer, the fluid pressure in said lifting jacks is released, the spring members have been detached and the chassis is let down as shown in Fig. 2, and by dotted lines, as shown in Fig. 4. The rear end 10—a of the trailer chassis rests on the ground and said trailer can be easily loaded. When loaded the fluid pressure is introduced into the lifting jacks and the chassis is raised to a point somewhat higher than normal hauling position (see Fig. 6).

The spring members 22 carry an abutment member 24 terminating in a rounded head 25 constructed to engage in a recess or socket 26 fixed to the bracket 17. As the spring member 22 is thrust into the bracket 17, it will first strike the end of a plunger 30 which has been locked in a retracted position, the notch 31 engaged with the rib 32 of the bracket 17 (see dotted line showing in Fig. 6). On striking this plunger, same is immediately released, and the spring 33 acts to advance the plunger 30. The spring member 22 carries a depending bar 34 which acts as a striker engaging the pivoted latch member 35. The bar 34 strikes the latch and engages in the notch 36, the spring 37 holding the latch 35 in position, the heel of said latch being constructed to permit movement in one direction only against the tension of the spring 37. When this bar 34 is positioned in the notch 36, the head 25 is aligned with the socket 26 and will be secured in that position while the chassis is being lowered to engage the head 25 in said socket 26.

Figure 7:
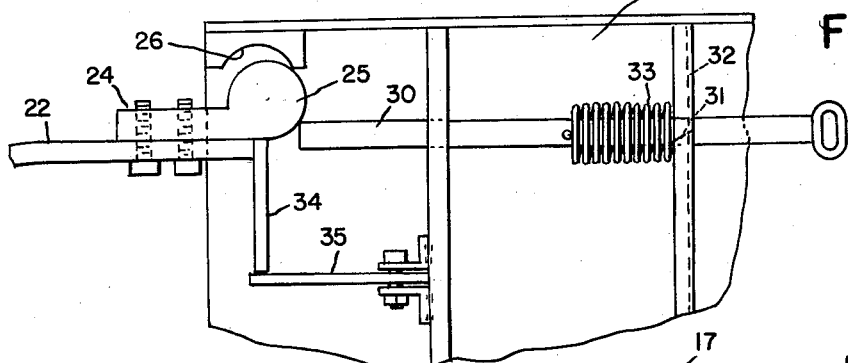
Fig. 7 is a similar detail view of the latching means, showing the loaded chassis being lowered onto said spring member support.

As the chassis is lowered, the plunger 30 is advanced under the abutment 24 (see Fig. 7) and is sufficiently advanced as the head enters the socket 26 to prevent the head from accidentally coming out of the socket, and the bar 34 is still latched in the notch 36 of latch 35 but is about to be disengaged.

In Fig. 8 the spring member is securely locked in the socket 26 and the bar 34 is disengaged from the latch 35 which had temporarily secured the spring member.

To release the spring member and prepare for lowering the chassis, one will first release the upper latch and retract the plunger 30 thereby permitting the lifting jacks to be actuated and operating to lift the socket off the head 25. It will be observed that when the abutment 24 and head 25 is seated in the socket, the chassis may be lifted straight up since the bar 34 has been moved relative to latch 35 and when the chassis is lifted the bar will clear the end of the latch 35. It will be noted that the head 25 is cammed into socket 26 to move bar 34 out of alignment with latch 35 on being locked so same can be freely released when desired.

It will be apparent that while only one preferred construction of the invention is herein illustrated and described, various modifications and changes may be made by anyone skilled in the art to which this invention pertains, without departing from the spirit of the invention or from the scope of the appended claims.

I claim:

1. In a trailer, a trailer axle, a trailer body chassis hinged to the axle and adapted to be selectively raised and lowered, a socket carried by said body chassis, a spring member anchored to the axle and freely movable into and out of engagement with the socket when said body chassis is elevated, and latching means associated with the body chassis and spring member to temporarily secure the spring member in alignment with the socket, said latching means released when said spring member becomes engaged in the socket.

2. In a trailer having an axle and a body chassis hinged to the axle, a socket carried by the body chassis, a spring member anchored to the axle and supporting said chassis, latching means to lock said spring member in said socket when the loaded trailer chassis is lowered on said spring member, and a second latching means operable to temporarily secure said spring member in alignment with the socket and releasable when said spring element is secured in said socket.

3. In a trailer having an axle and a body chassis hinged to the axle, a socket carried by the body chassis, a spring member anchored to the axle and supporting said chassis, latching means to lock said spring member in said socket when the loaded trailer chassis is lowered on said spring member, and a second latching means operable to temporarily secure said spring member in alignment with the socket and releasable when said spring element is secured in said socket, said first latching means comprising a spring biased plunger supported by the chassis and positioned in alignment with said spring element when said chassis is elevated so that when the spring element is moved into position to align same with the socket when said plunger is initially retracted and subsequently advanced to lock the spring element in said socket as the chassis is lowered onto the spring member, said second latching means comprising a spring biased latch member and a striker carried by the spring member engaging in said spring biased latch member as the spring member is moved into alignment with the socket when said chassis is in elevated position whereby to lock the spring member in alignment with said socket, said spring biased latch member carried by the chassis and moved out of engagement with the striker on lowering said chassis to engage and lock the spring member in said socket.

4. In a trailer having an axle and a body chassis hinged to the axle, a socket carried by the body chassis, a spring member anchored to the axle and supporting said chassis, latching means to lock said spring member in said socket when the loaded trailer chassis is lowered on said spring member, and a second latching means operable to temporarily secure said spring member in alignment with the socket and releasable when said spring element is secured in said socket, said first latching means comprising a spring biased plunger supported by the chassis and positioned in alignment with said spring element when said chassis is elevated so that when the spring element is moved into position to align same with the socket when said plunger is initially retracted and subsequently advanced to lock the spring element in said socket as the chassis is lowered onto the spring member, said second latching means comprising a spring biased latch member and a striker carried by the spring member engaging in said spring biased latch member as the spring member is moved into alignment with the socket when said chassis is in elevated position whereby to lock the spring member in alignment with said socket, said spring biased latch member carried by the chassis and moved out of engagement with the striker on lowering said chassis to engage and lock the spring member in said socket, the operation of said second latching means being timed to be released subsequent to actuation of said first latching means into latching engagement with said spring member.

5. In a trailer having an axle and a chassis hinged to the axle, a socket carried by the chassis, a spring member anchored to the axle and constructed to provide a yielding support for said chassis and provided with an abutment constructed complementary to the socket and engaged therein, latching means carried by the chassis and engaging said spring member to substantially align the abutment with respect to the socket, a second latching means cooperating with the spring member to lock the abutment in said socket, said first latching means constructed to temporarily engage said spring member to lock same in alignment with said socket until said abutment has partially entered said socket and said second latching means has begun to function to lock the abutment against removal from said socket.

6. In a trailer having an axle and a chassis hinged to the axle, a socket carried by the chassis, a spring member anchored to the axle and constructed to provide a yielding support for said chassis and provided with an abutment constructed complementary to the socket and engaged therein, latching means carried by the chassis and engaging said spring member to substantially align the abutment with respect to the socket, a second latching means cooperating with the spring member to lock the abutment in said socket, said first latching means constructed to temporarily engage said spring member to lock same in alignment with said socket until said abutment has partially entered said socket and said second latching means has begun to function to lock the abutment against removal from said socket, said spring members having a striker fixed thereto for engagement with said first latching means, said abutment being shifted on full engagement within said socket subsequent to the release of said first latching means to displace said striker relative to the aforesaid first latching means, whereby to permit subsequent disengagement of the spring member and socket on elevating said trailer chassis without again engaging said first latching means.

GERALD C. FRANCIS.

REFERENCES CITED

The following references are of record in the file of this patent:

UNITED STATES PATENTS

| Number | Name | Date |
|---|---|---|
| 1,209,322 | Neal | Dec. 19, 1916 |